(12) United States Patent
Yoshioka

(10) Patent No.: US 8,079,632 B2
(45) Date of Patent: Dec. 20, 2011

(54) DOOR STRUCTURE OF VEHICLE

(75) Inventor: Sinichi Yoshioka, Chiba (KR)

(73) Assignees: Hyundai Motor Japan R&D Center, Inazi (JP); Hyundai Motor Company, Seoul (KR); Kia Motor Corporation, Seoul (KR)

( * ) Notice: Subject to any disclaimer, the term of this patent is extended or adjusted under 35 U.S.C. 154(b) by 63 days.

(21) Appl. No.: 12/626,313

(22) Filed: Nov. 25, 2009

(65) Prior Publication Data

US 2011/0037288 A1    Feb. 17, 2011

(30) Foreign Application Priority Data

Aug. 12, 2009    (JP) ................................. 2009-187572

(51) Int. Cl.
    *B60J 5/04*    (2006.01)
(52) U.S. Cl. ................. 296/146.6; 296/187.12
(58) Field of Classification Search .................. 296/35.2, 296/146.1, 146.5, 146.6, 187.01, 187.03, 296/193.06, 203.01, 203.03, 205, 187.12
    See application file for complete search history.

(56) References Cited

U.S. PATENT DOCUMENTS

| | | | | |
|---|---|---|---|---|
| 5,417,470 A | * | 5/1995 | Holt | 296/187.12 |
| 6,302,474 B1 | * | 10/2001 | Drysdale et al. | 296/146.6 |
| 6,959,957 B2 | * | 11/2005 | Fukuchi et al. | 296/146.5 |
| 7,857,375 B2 | * | 12/2010 | Huttsell et al. | 296/146.6 |
| 2008/0246308 A1 | * | 10/2008 | Uchida et al. | 296/187.03 |

FOREIGN PATENT DOCUMENTS

| | | | |
|---|---|---|---|
| EP | 1428707 A1 | * | 6/2004 |
| JP | 9-249028 A | | 9/1997 |
| JP | 10-250369 A | | 9/1998 |
| JP | 2000-127880 A | | 5/2000 |
| JP | 2001-138742 A | | 5/2001 |
| JP | 2008-87741 A | | 4/2008 |
| JP | 2008-100572 A | | 5/2008 |
| JP | 2008-189038 A | | 8/2008 |
| JP | 2008239107 A | * | 10/2008 |

* cited by examiner

*Primary Examiner* — Dennis Pedder
*Assistant Examiner* — Jason S Daniels
(74) *Attorney, Agent, or Firm* — Morgan, Lewis & Bockius LLP

(57) ABSTRACT

A door structure of a vehicle includes a reinforcing member horizontally extending from a leading end, which is connected to a leading reinforce-installation fitting, and to a tail end, which is connected to a tail reinforce-installation fitting, an upper vertical beam extending from an upper end, which is connected to a head-installation fitting, to a lower end, which is connected to the tail reinforce-installation fitting, a lower vertical beam inclined to the upper vertical beam and extending from an upper end, which is connected to the tail reinforce-installation fitting, to a lower end, which is connected to a base-installation fitting, and a horizontal beam positioned below the reinforcing member and extending from a leading end, which is connected to a leading beam-installation fitting, to a tail end, which is connected to a tail beam-installation fitting, such that the horizontal beam intersects the lower vertical beam.

2 Claims, 7 Drawing Sheets

DOOR STRUCTURE OF VEHICLE

CROSS-REFERENCE TO RELATED APPLICATION

The present application claims priority of Japanese Patent Application No. 2009-187572 filed Aug. 12, 2009, the entire contents of which application is incorporated herein for all purposes by this reference.

BACKGROUND OF THE INVENTION

1. Field of the Invention

The present disclosure relates to a door structure of a vehicle. More particularly, it relates to a door structure for a vehicle, which upon a side collision, can prevent a door from projecting into the interior of a vehicle.

2. Description of Related Art

Japanese Patent Publication No. 2008-239107 discloses a door structure of front and rear doors of a vehicle in which there is no center pillar on a side of the body thereof and a reinforcing member is installed inside the doors. Generally, in a front door of a vehicle, upper and lower vertical reinforcing members are connected with each other by means of a connector. Upon a side collision of a vehicle, the connector is bent and deformed so as to absorb a collision force and also reduce the distance that the car body moves in a side direction. In addition, increasing rigidity of the reinforcing member can prevent the reinforcing member from being projected into the interior of a vehicle.

However, a vertical reinforcing member of Japanese Patent Publication No. 2008-239107, which is vertically extended in the front door, consists of a single elongated pipe, so that, when a lower end thereof is projected into the interior of a vehicle upon a side collision, the entire portion of the reinforcing member also intrudes by a corresponding distance. Like this, the vertical reinforcing member cannot sufficiently restrict by how far it will be projected into the interior of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to solve the above-described problems associated with prior art. The present invention is directed toward providing a door structure for a vehicle, which can restrict by how far a vertical reinforcing member (also referred to as a 'vertical beam') in a front door will be projected into the interior of a vehicle upon a collision.

In one aspect, the present invention provides a door structure on a side body of a vehicle, the side body including front and rear doors, the door structure including: a reinforcing member horizontally extending from a leading end, which is connected to a leading reinforce-installation fitting, and to a tail end, which is connected to a tail reinforce-installation fitting; an upper vertical beam extending from an upper end, which is connected to a head-installation fitting, to a lower end, which is connected to the tail reinforce-installation fitting; a lower vertical beam inclined to the upper vertical beam and extending from an upper end, which is connected to the tail reinforce-installation fitting, to a lower end, which is connected to a base-installation fitting; and a horizontal beam positioned below the reinforcing member and extending from a leading end, which is connected to a leading beam-installation fitting, to a tail end, which is connected to a tail beam-installation fitting, such that the horizontal beam intersects the lower vertical beam.

In one embodiment, the lower end of the upper vertical beam, the upper end of the lower vertical beam, and the tail end of the reinforcing member may be joined and supported together on the tail reinforce-installation fitting on the side of the interior of the vehicle.

In another embodiment, an auxiliary beam may be provided such that it is connected between the leading beam-installation fitting and the base-installation fitting.

Other aspects and embodiments of the invention are discussed infra.

It is understood that the terms "vehicle" or "vehicular" or other similar terms as used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
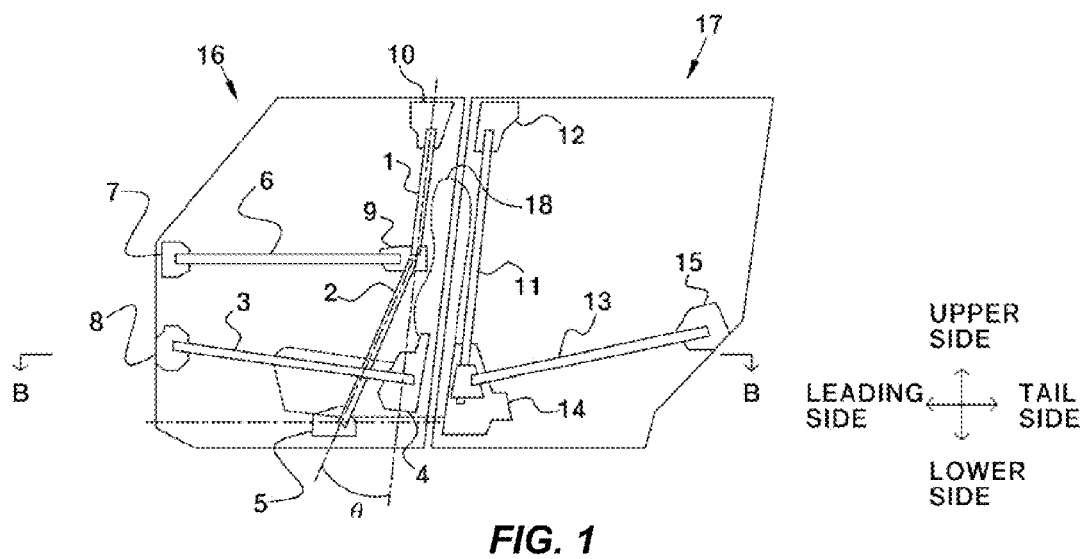
FIG. 1 is a side view illustrating a first example of a door structure of a vehicle according to an exemplary embodiment of the present invention.

It should be understood that the appended drawings are not necessarily to scale, and that they present a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

EXAMPLES

The following examples illustrate the invention and are not intended to limit the same.

Test Examples

FIG. 1 is a side view illustrating a first example of a door structure of a vehicle according to an exemplary embodiment of the present invention.

As illustrated in FIG. 1, a side body of a vehicle includes a front door 16 and a rear door 17. There is no center pillar between the front door 16 and the rear door 17, and an end of the front door and an end of the rear door are placed adjacent to each other so as to cover the region of an opening occupied by the center pillar. Though not illustrated, on the upper portions of reinforcing members 6 of the front door 16 and the rear door 17, there are window sections in which window glass is installed in such a manner as to be vertically movable. A front seat 18 is installed between the front door 16 and the rear door 17 in the interior of a vehicle as seen in the side body of the vehicle.

In FIG. 1, the front door 16 contains the reinforcing member 6, an upper vertical beam 1, a lower vertical beam 2, and a horizontal beam 3. These beams consist of a hollow pipe. The reinforcing member 6 is horizontally installed in the middle of the front door 16 such that it extends between a leading end, which is connected to a leading reinforce-installation fitting 7, and a tail end, which is connected to a tail reinforce-installation fitting 9.

The upper vertical beam 1 extends between an upper end, which is connected to a head-installation fitting 10, and a lower end, which is connected to the tail reinforce-installation fitting 9. The upper vertical beam is a beam which is installed on an upper section of the front door 16 where the window section exists.

The lower vertical beam 2 is a beam which is installed on a lower section of the front door 16. The lower vertical beam extends between an upper end, which is connected to the tail reinforce-installation fitting 9, and a lower end, which is connected to a base-installation fitting 5. The lower vertical beam 2 is inclined to the upper vertical beam 1 at a predetermined angle (θ), but not including 0 degrees, so that the position of base-installation fitting 5 is moved by some degree towards a leading side of the front door and therefore upon a side collision, the lower vertical beam 2 can be restricted from projecting into the interior of the vehicle.

The horizontal beam 3 is installed below the reinforcing member 6 such that it intersects the lower vertical beam 2. In this case, the horizontal beam 3 may be installed farther from the front door 16 than the lower vertical beam 2 and the lower vertical beam 2 may be installed closer to the front door 16 than the horizontal beam 3, and vice versa. The horizontal beam 3 horizontally extends in an inclined manner from a leading end to a tail end, i.e. to the tail side of the front door 16, wherein the leading end is connected to a leading beam-installation fitting 8 and the tail end is connected to a tail beam-installation fitting 4. An intersecting point between the lower vertical beam 2 and the horizontal beam 3 can be determined, taking into consideration a position of the front seat 18, the waist of an occupant of the seat, or the like.

The rear door 17 includes therein a vertical leading reinforce beam 11 and a horizontal lower reinforce beam 13.

Figure 2:
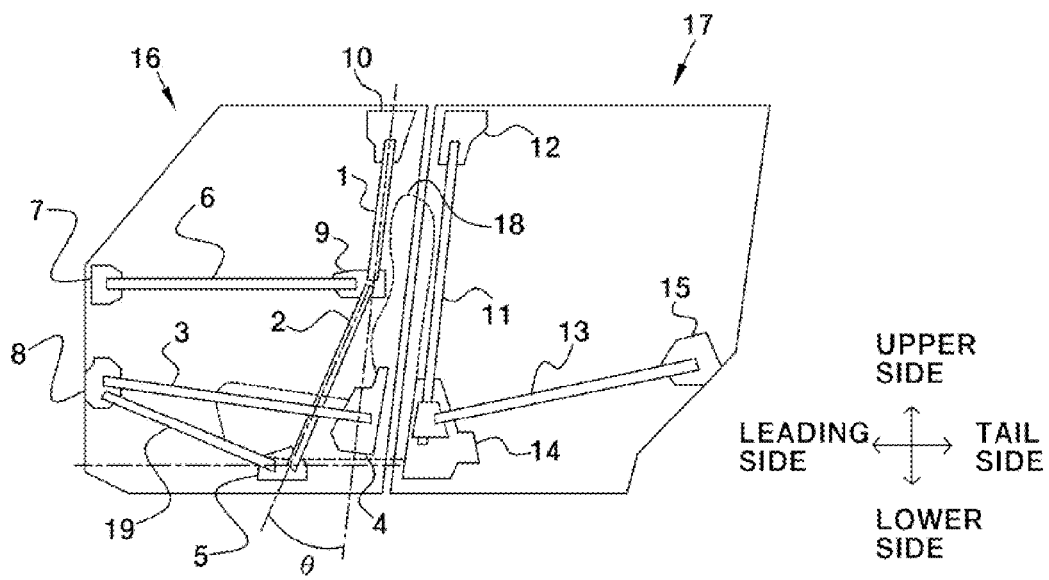
FIG. 2 is a side view illustrating a second example of a door structure of a vehicle according to an exemplary embodiment of the present invention.

FIG. 2 is a side view illustrating a second example of a door structure of a vehicle according to an exemplary embodiment of the present invention. In the present embodiment, in addition to the construction of FIG. 1, an auxiliary beam 19 is provided such that it is connected between the leading beam-installation fitting 8 and the base-installation fitting 5. Since the auxiliary beam 19 reinforces the lower section of the front door 16, a load applied upon a side collision can be decentralized and an amount of projection of the lower vertical beam 2 into the interior of the vehicle can be further reduced.

Figure 3:
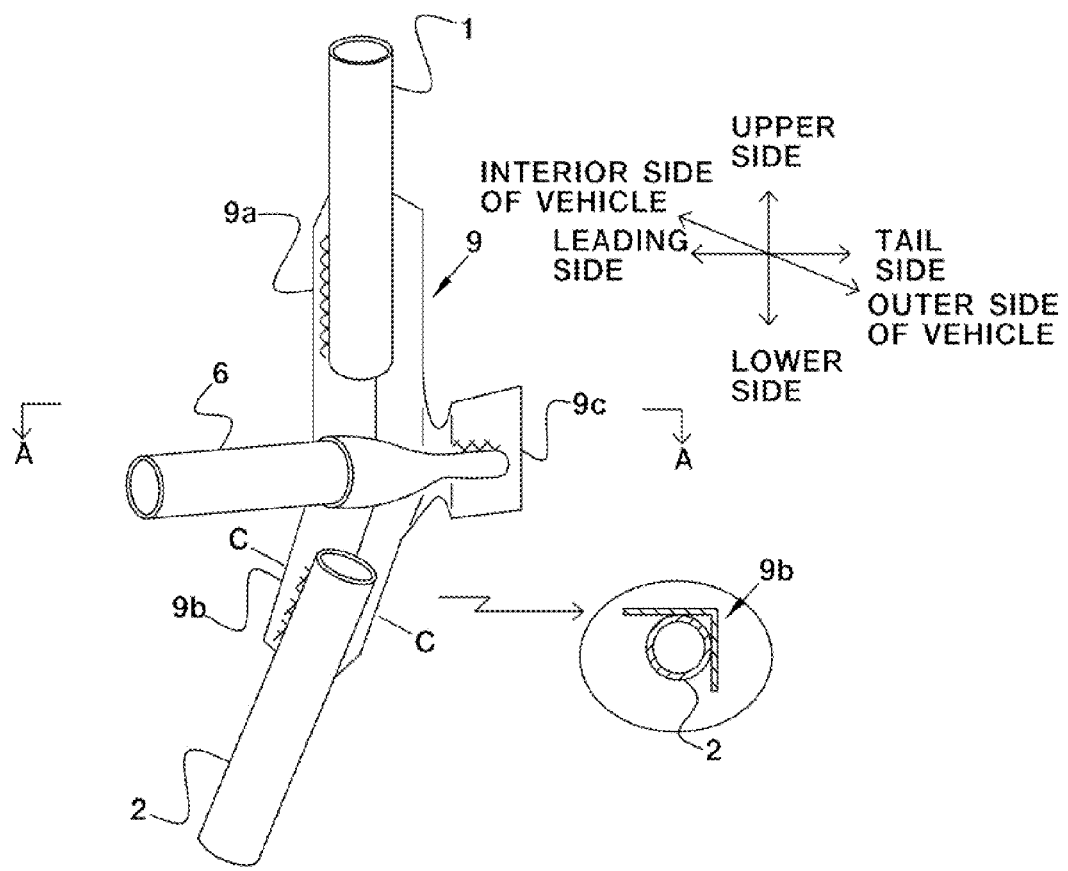
FIG. 3 is a perspective view illustrating a section of a tail reinforce-installation fitting illustrated in FIG. 1.

FIG. 3 is a perspective view illustrating a section of the tail reinforce-installation fitting illustrated in FIG. 1. The tail reinforce-installation fitting 9 has a sectional shape of a letter of 'L', roughly (see C-C section shown in a circle in FIG. 3), and is provided with an upper inlet corner 9a, a lower inlet corner 9b, and a side projection end 9c. To the end 9c, the upper inlet corner 9a, and the lower inlet corner 9b, the tail end of the reinforcing member 6, the lower end of the upper vertical beam 1, and the upper end of the lower vertical beam 2 are respectively connected. The tail end of the reinforcing member 6, the lower end of the upper vertical beam 1, and the upper end of the lower vertical beam 2 are supported on the interior side of the vehicle because they are connected to the tail reinforce-installation fitting which is welded to the interior side of the vehicle. Thus, when the lower vertical beam 2 is shocked by a side collision, the tail reinforce-installation fitting 9 becomes bent and deformed, which reduces the load to be applied to the upper vertical beam 1, thereby decreasing the amount by which the upper vertical beam 1 projects into the interior of the vehicle.

Figure 4:
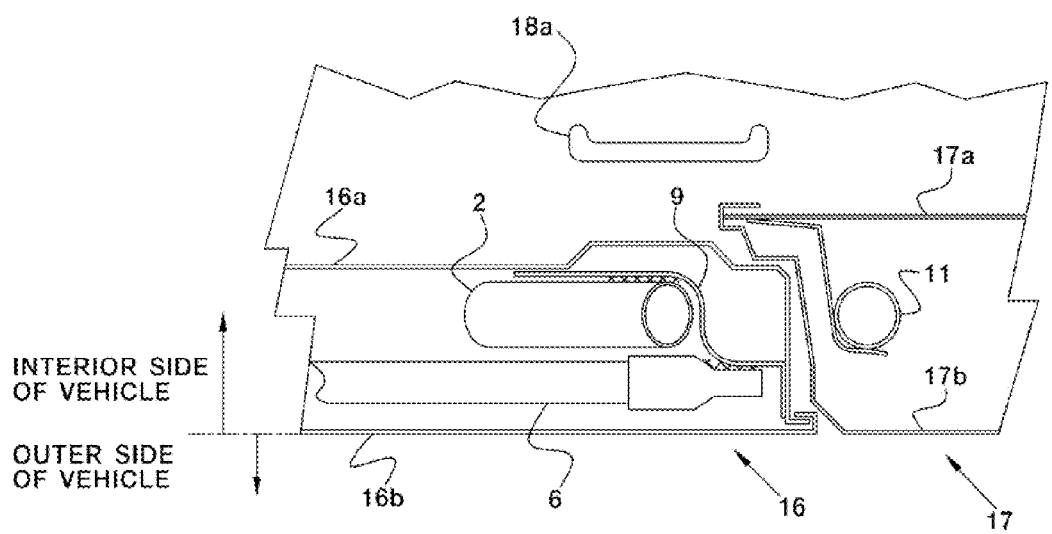
FIG. 4 is a cross-sectional view taken along line A-A, which illustrates the section of the tail reinforce-installation fitting illustrated in FIG. 3.

FIG. 4 is a cross-sectional view taken along line A-A, which illustrates the section of the tail reinforce-installation fitting 9 illustrated in FIG. 3. The front door 16 comprises an inner member 16a and an outer member 16b. The rear door 17 comprises an inner member 17a and an outer member 17b. The tail reinforce-installation fitting 9 is installed on the tail side of the inner member 16a of the front door. The lower vertical beam 2 is arranged in an inclined manner and the upper end thereof is welded to the tail reinforce-installation fitting 9. The tail end of the reinforcing member 6 is also welded to the tail reinforce-installation fitting 9. A seat cushion 18a is provided between the front door 16 and the rear door 17.

Figure 5:
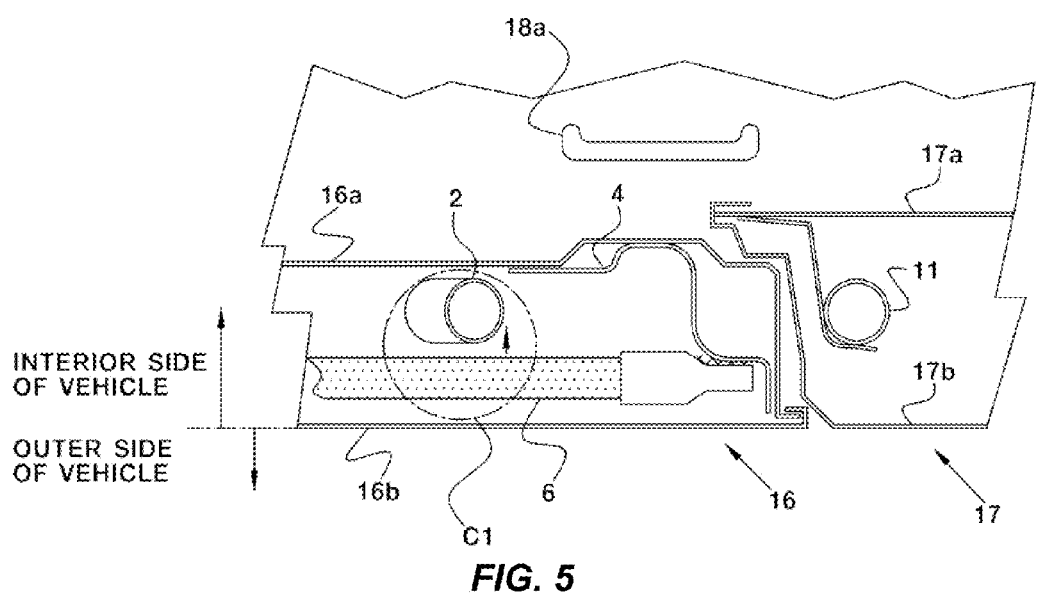
FIG. 5 is a cross-sectional view taken along line B-B, which illustrates a section of a tail beam-installation fitting illustrated in FIG. 1.

FIG. 5 is a cross-sectional view taken along line B-B, which illustrates a section of the tail beam-installation fitting 4 illustrated in FIG. 1. As shown in a circle C1 in FIG. 5, the horizontal beam 3 and the lower vertical beam 2 intersect each other in such a manner that the horizontal beam 3 is positioned outside the lower vertical beam 2 in the front door 16. The tail beam-installation fitting 4 is installed on the tail side of the inner member 16a of the front door. The tail end of the horizontal beam 3 is welded to the end of the tail beam-installation fitting 4. When the tail end of the horizontal beam 3 presses and breaks the end of the tail beam-installation fitting 4 upon a side collision, the horizontal beam 3 comes into contact with and presses against the lower vertical beam 2.

Figure 6:
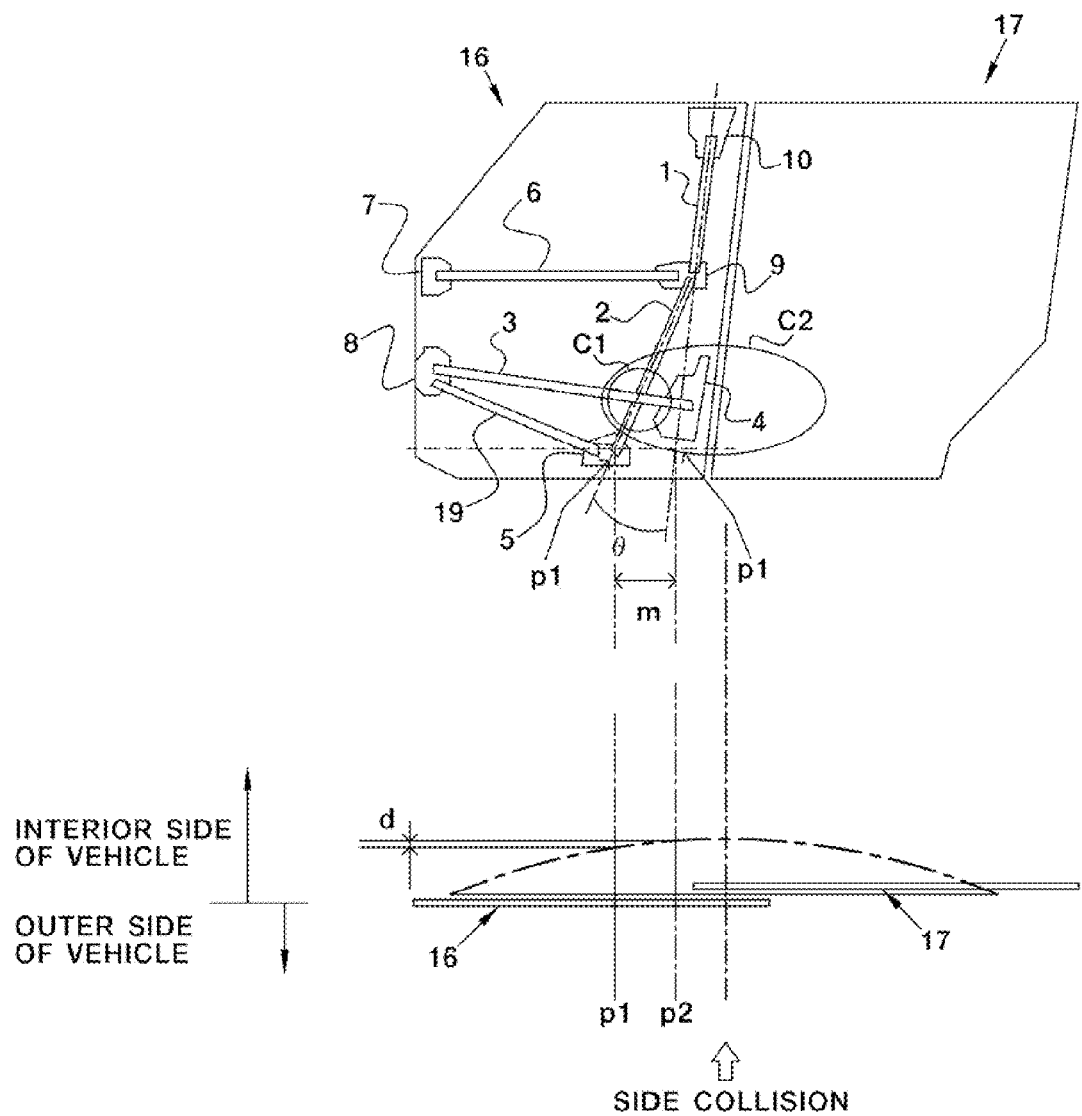
FIG. 6 is a view explaining the state of a front door destined to be deformed upon a side collision.

FIG. 6 is a view explaining the state of a front door destined to be deformed upon a side collision. A reference sign p1 indicates a connection point of the lower end of the lower vertical beam 2 with the base-installation fitting 5. A reference sign p2 indicates an intersection point where a lower extension line of the upper vertical beam 1 meets a horizontal line passing through the point p1. The lower vertical beam 2 is provided slightly inclined at an angle (θ) to the upper vertical beam 1, so that the point p1 is moved towards the leading side of the front door by a length of m (=p1-p2). FIG. 6 indicates the state that upon a side collision, the front door 16 and the rear door 17 are deformed as shown by the dashed dotted line. Upon being deformed, if the point p1 moves forwards by the length m, the amount of projection into the interior of the vehicle can be reduced by d. Upon a side collision, the collision force F is applied to the portion of the center of a circle C2 in FIG. 6, and thus the horizontal beam 3 is projected towards the interior of the vehicle and contacts and presses the lower vertical beam 2. In this case, the lower vertical beam 2 supports the horizontal beam by the connection between the base-installation fitting 5 and the tail reinforce-installation fitting 9.

If the auxiliary beam 19 is installed, it supports the base-installation fitting 5 at the tail end thereof so as to further reduce the amount by which it protrudes into the interior of the vehicle at the point p1.

Figure 7:
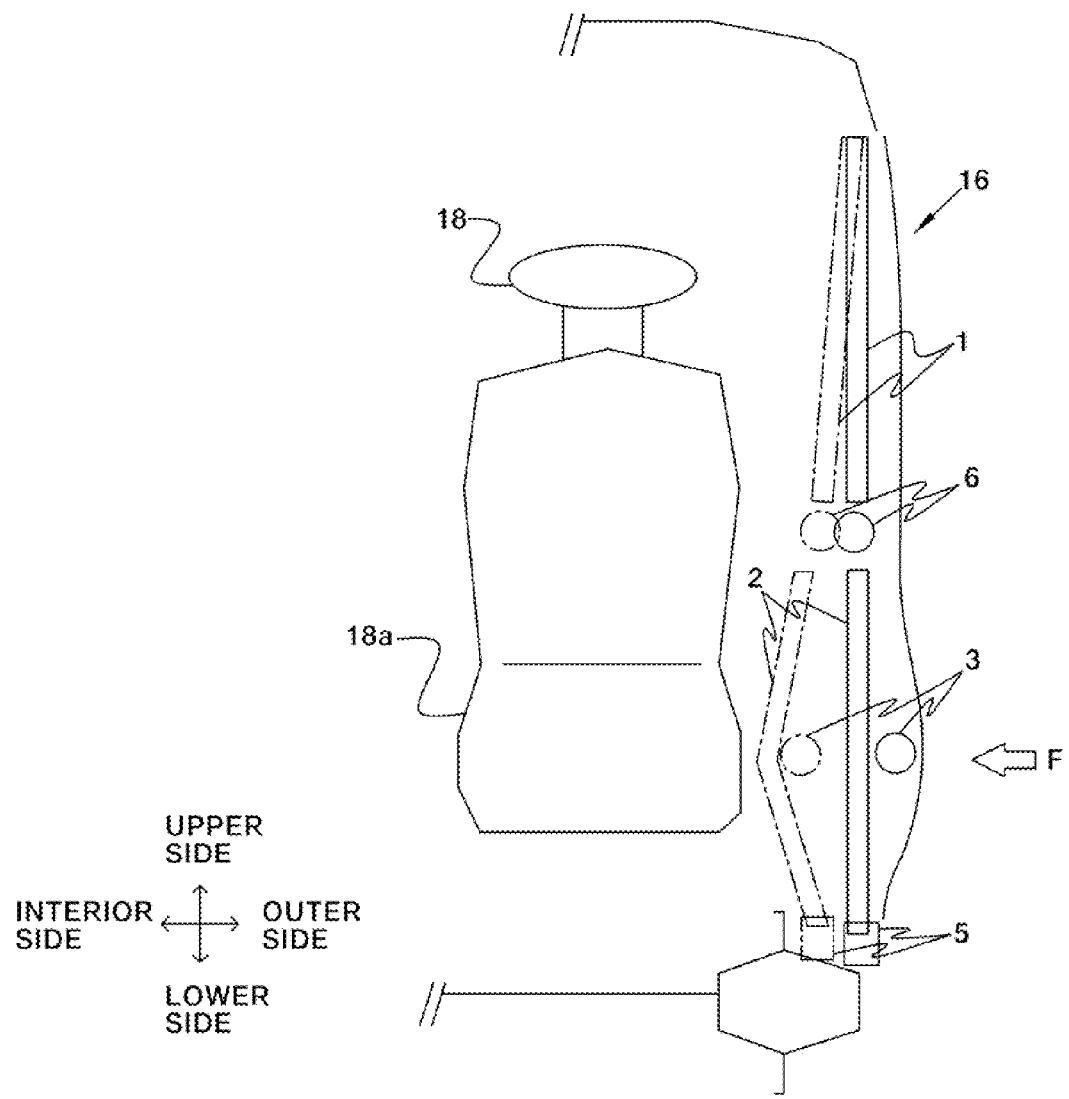
FIG. 7 is another view explaining the state of a front door destined to be deformed upon a side collision.

FIG. 7 is another view explaining the state of a front door to be deformed upon a side collision. If the horizontal beam 3 is made to protrude into the interior of the vehicle because of a side collision, the lower vertical beam 2 becomes bent by contact pressure of the horizontal beam, which both absorbs the collision load and reduces the amount of protrusion into the interior of the vehicle. In various embodiments, the strength of the horizontal beam 3 be greater than that of the lower vertical beam 2.

Reduction in an amount of projection of the lower vertical beam 2 into the interior of the vehicle also reduces the amount of projection of the upper vertical beam 1, which is welded to the tail reinforce-installation fitting 9, into the interior of the vehicle.

As set forth before, according to the door structure of a vehicle of the present invention, if a side collision occurs at a lower portion between the front door and the rear door, (1) the lower vertical beam can be restricted from protruding into the interior of the vehicle because it is inclined relative to the upper vertical beam; (2) the upper vertical beam can also be restricted from protruding into the interior of the vehicle because the upper end of the lower vertical beam is connected to the tail reinforce-installation fitting so that if a load is applied to the lower vertical beam, the tail reinforce-installation fitting is deformed.

Further, since the lower end of the upper vertical beam, the upper end of the lower vertical beam and the tail end of the reinforcing member are welded to the tail reinforce-installation fitting and supported on the interior side of the front door, it is difficult to transfer the load applied to the lower vertical beam upon a side collision to the upper vertical beam, thereby restricting the upper vertical beam from becoming protruded into the interior of the vehicle.

Furthermore, since the auxiliary beam is connected between the leading beam-installation fitting and the base-installation fitting reinforces the lower leading side of the front door, the lower vertical beam can be further restricted from protruding into the interior of the vehicle upon a side collision.

Consequently, since the door structure of the invention can reduce by how far the side door projects into the interior of the vehicle upon a side collision, it is greatly applicable to a door structure of a vehicle without a center pillar.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door structure on a side body of a vehicle, the side body including front and rear doors, the door structure comprising:
    a reinforcing member horizontally extending from a leading end connected to a leading reinforce-installation fitting, to a tail end connected to a tail reinforce-installation fitting;
    an upper vertical beam extending from an upper end connected to a head-installation fitting, to a lower end connected to the tail reinforce-installation fitting;
    a lower vertical beam inclined relative to the upper vertical beam and extending from an upper end connected to the tail reinforce-installation fitting, to a lower end connected to a base-installation fitting; and
    a horizontal beam positioned below the reinforcing member and extending from a leading end connected to a leading beam-installation fitting, to a tail end connected to a tail beam-installation fitting, such that the horizontal beam intersects the lower vertical beam;
    wherein an auxiliary beam is further provided such that it is connected between the leading beam-installation fitting and the base-installation fitting.

2. The door structure of claim 1, wherein the lower end of the upper vertical beam, the upper end of the lower vertical beam, and the tail end of the reinforcing member are joined and supported together on the tail reinforce-installation fitting on the side of the interior of the vehicle.

* * * * *